(12) United States Patent
Meldahl et al.

(10) Patent No.: US 6,735,526 B1
(45) Date of Patent: May 11, 2004

(54) METHOD OF COMBINING DIRECTIONAL SEISMIC ATTRIBUTES USING A SUPERVISED LEARNING APPROACH

(75) Inventors: Paul Meldahl, Forus (NO); Roar Heggland, Stavanger (NO); P. F. M. De Groot, Enschede (NL); A. H. Bril, Enschede (NL)

(73) Assignee: Den Norske Stats Oljeselskap A.S., Stavanger (NO)

( * ) Notice: Subject to any disclaimer, the term of this patent is extended or adjusted under 35 U.S.C. 154(b) by 0 days.

(21) Appl. No.: 09/786,905

(22) PCT Filed: Sep. 13, 1999

(86) PCT No.: PCT/GB99/03039

§ 371 (c)(1),
(2), (4) Date: Jun. 15, 2001

(87) PCT Pub. No.: WO00/16125

PCT Pub. Date: Mar. 23, 2000

(30) Foreign Application Priority Data

Sep. 11, 1998  (GB) ................................................ 9819910

(51) Int. Cl.$^7$ ................................................ G01V 1/28
(52) U.S. Cl. ........................... 702/14; 702/16; 702/17
(58) Field of Search ........................ 702/14, 16, 17

(56) References Cited

U.S. PATENT DOCUMENTS

| | | | |
|---|---|---|---|
| 4,992,995 A | | 2/1991 | Favret |
| 5,444,619 A | | 8/1995 | Hoskins |
| 5,724,309 A | | 3/1998 | Higgs |
| 5,940,777 A | * | 8/1999 | Keskes ........................ 702/16 |
| 5,987,388 A | * | 11/1999 | Crawford et al. ............. 702/16 |
| 6,011,557 A | * | 1/2000 | Keskes et al. .............. 345/582 |
| 6,049,760 A | * | 4/2000 | Scott ........................... 702/14 |

FOREIGN PATENT DOCUMENTS

WO    9733184    9/1997

OTHER PUBLICATIONS

Search Report—PCT/GB99/03039.
Preliminary Examination Report—PCT/GB99/03039.

* cited by examiner

*Primary Examiner*—Marc S. Hoff
*Assistant Examiner*—Anthony Gutierrez
(74) *Attorney, Agent, or Firm*—Patterson, Thuente, Skaar & Christensen, P.A.

(57) ABSTRACT

A method of combining directional seismic attributes using a supervised learning approach which may include extracting seismic information from acquired data in a direction along the spatial direction of a body of interest. The method is applicable both to onshore and offshore exploration and provides a more reliable means of detecting, separating and identifying geological features, for example gas chimneys, faults, layers, and any other type of geological objects with a spatial direction and shape. The method is also suited for the detection of reservoir changes by the use of time lapse seismic techniques.

4 Claims, 2 Drawing Sheets

METHOD OF COMBINING DIRECTIONAL SEISMIC ATTRIBUTES USING A SUPERVISED LEARNING APPROACH

RELATED APPLICATIONS

The present application claims the benefit of PCT Application No. PCT/GB99/03039, filed Sep. 13, 1999 and Great Britain No. Application 9819910.2, filed Sep. 11, 1998.

FIELD OF THE INVENTION

The present invention is concerned with a method of processing seismic signals in order to identify and characterize subsurface features within geological formations. The invention is applicable both to onshore and offshore exploration.

BACKGROUND OF THE INVENTION

In conventional 3-D seismic surveying, seismic data is acquired along closely spaced lines to provide detailed subsurface information. With such high density coverage, large volumes of digital data must be recorded, stored and processed prior to interpretation. The processing requires extensive computer resources. When the data has been processed it is interpreted in the form of a 3-D cube which effectively represents a display of subsurface features. The information within the cube can be displayed in various forms, such as horizontal time slice maps, vertical slices or sections in any direction.

Generally, in traditional seismic interpretation, one or more seismic events is identified and tracked to yield a set of seismic horizons. Together these horizons are used to form the structural framework of the subsurface in two-way time, or depth as the case may be. All subsequent geological modeling and most of today's seismic inversion schemes rely heavily on this framework. For example, seismic attributes can be extracted around an interpreted horizon and used to characterize a reservoir unit.

SUMMARY OF THE INVENTION

It is an object of the present invention to provide an improved method of utilizing seismic data in order to provide a more reliable means of detecting, separating and identifying geological features.

According to one aspect of the invention, the extraction of seismic information from the data acquired is directed or steered along the object which is to be characterized.

This sense of directionality is lacking in current conventional seismic volume interpretations; neither the direction, nor the shape of the bodies is utilized in the current technology. In general, in the present invention, the seismic volume may be converted into a domain where a particular geological object can be detected more easily. For example, shallow-gas sands may show up as bright spots in an 'energy' attribute volume. Volume attribute transformations can be both single-trace and multi-trace.

Thus directional seismic attributes are used to enhance the texture of the objects of interest. Directional attributes are here defined as quantities derived from a set of seismic traces along the spatial direction of the body of interest. In a subsequent step, geometrical constraints might be applied to the enhanced texture volume to improve the detection of the geological objects of interest still further. The procedure is particularly convenient for detecting gas chimneys, but can be used equally well to detect faults, layers, and any other type of geological objects with a spatial direction and shape. The procedure is also suited for the detection of reservoir changes by the use of time lapse seismic techniques.

Conveniently, the invention provides a two step procedure aimed at detection and separation of objects from seismic data volumes. The first step may enhance the texture of seismic bodies, while post-processing the enhanced volume is the second step. In both steps the spatial direction is utilized. After the enhanced volumes are recognized they can be extracted and displayed for characterization. The procedure can be applied to multiple seismic volumes (reflectivity, impedance, near offset, far offset, gradient, intercept, etc.) in an iterative manner.

According to the invention, therefore, seismic attributes are extracted relative to the spatial direction of the objects which it is desired to detect. For example, a gas chimney is basically a vertical disturbance of the seismic response due to gas seepage. To detect such an object, seismic data attributes would be extracted in a vertical direction. This may be achieved e.g. by extracting attributes in multiple time gates (actually multiple 3D control volumes) above and below each extraction point. Stratigraphic objects (layers, channels, sequences, etc.) and faults cannot be detected as simply as vertical disturbances because their direction varies spatially. However, if the dominating direction in the seismic data at every sample position is known, this direction can be used to orient the time gates or 3D sub-volumes parallel to the direction, from which attributes are extracted. The local dominating direction, expressed as dip and azimuth, can be calculated at every seismic sample position in different ways.

The number, size and separation distance of the extraction volumes are parameters that control the importance of spatial direction in the procedure (attribute directivity). The accuracy of the spatial direction estimate and the attribute directivity can be tuned to prevent degradation in the attributes. According to another aspect of the invention, therefore, the direction and shape of the control volumes from which attributes are extracted are adjusted to provide an optimum combination, in dependence upon the nature of the geological features which is to be detected.

Not only is the directivity of the attributes important but also the type and combination of attributes may be an important factor in the procedure. Preferably, only attributes that enhance the difference between objects and background are elected. Multiple attributes, possibly extracted from different seismic volumes may subsequently be combined to yield optimal separation.

Hundreds of seismic attributes are nowadays available on seismic workstations. These include the following types with potential for use in the method of the present invention:

a) seismic amplitudes at sample positions (i.e. the raw trace data)

b) instantaneous attributes: amplitudes, phase and frequency c) pre-stack attributes: intercept and gradient energy d) trace to trace similarity e) minimum and maximum amplitudes and areas f) local dip & azimuth (used to steer the extraction volumes)

g) the number of sign changes in the derivative of the seismic traces (a new attribute).

Which of these or other attributes are chosen to enhance the texture of an object will depend upon the nature of the objects and its image quality. Gas chimneys and faults for example will generally exhibit lower trace-to-trace similarity than stratigraphic objects. This is because the images of faults and gas chimneys are degraded due to limitations in acquisition and processing. Complex overburden effects for example, cannot be removed properly from the seismic image by current processing technology. Also the spatial sampling in the acquisition pattern degrades the resolution and signal to noise ratio of gas chimneys and faults.

In general, stratigraphic objects tend to be less degraded than other objects. This is mainly due to the fact that seismic acquisition and processing techniques are currently tuned to focus on horizontal and mildly dipping objects, rather than vertical, or steeply dipping events. With these considerations in mind it is logical to use trace-to-trace similarity as one of the attributes to enhance the difference between gas chimneys (or faults) and their surroundings. Other attributes with separation power could be 'energy' and 'instantaneous frequency'.

In general, the selection of attributes would be based on a study of the object and its characteristics and/or by an evaluation of the separation strength in the attribute control volumes and/or a combination of these. Each attribute in itself has separation power but maximum separation may be achieved by optimally combining the total set of attributes.

According to another aspect of the invention, a method of mapping a fault comprises extracting seismic information from data acquired using generally vertically oriented seismic control volumes sequentially in the region of the fault.

According to a further aspect of the invention, a method of mapping a gas chimney or other gas formation comprises extracting seismic information from data acquired using generally vertically oriented seismic control volumes sequentially in the region of the surfaces of the chimney.

According to a still further aspect of the invention, a method of mapping a stratum or layer comprises extracting seismic information from data acquired using sequential seismic control volumes oriented generally along the main spatial direction of the stratum or layer.

Attributes are preferably combined in an intelligent way to enhance the difference between bodies and background. Supervised learning approaches can be used for this purpose. A supervised learning approach requires a representative set of examples to train an algorithm e.g. an artificial neural network. In this case the seismic interpreter must identify a set of points in a control volume representative of bodies and background. At these points the directional attributes of choice are extracted and given to the algorithm. The algorithm then learns how the attributes must be combined such that an optimal classification into bodies and background is achieved. The trained algorithm is subsequently applied to the seismic volume(s). At every sample position the directional attributes are extracted and given to the trained algorithm. The output is then a classification in terms of bodies and background.

An alternative way of combining directional attributes would be to use an unsupervised learning approach. In unsupervised learning, the internal structure of the data is sought. The algorithm, e.g. an Unsupervised Vector Quantiser (UVQ) type of neural network, segments or clusters the dataset into a number of segments. Each segment represents a certain combination of attributes. The geological significance of the segments then remains to be interpreted.

The output of the first of the two preferred steps is a texture enhanced seismic volume. This can be a single directional attribute or a volume based on a combination of directional attributes. These volumes can be used for interpretation. Several post-processing options are feasible to enhance the separation power, in the second step.

In the first step, only directivity is used to enhance the texture of the object. According to a further aspect of the invention, in a second step, geometrical constraints, such as shape and dimension of the bodies, can be applied to enhance further the separation between real objects and events with similar texture. Spatial filters are one way of increasing the signal to noise ratio. In the present invention, preferably, the local direction (dip and azimuth) at every seismic sample position are used to adapt the orientation of the spatial filter.

Another possibility to utilize existing knowledge about body shapes and dimensions is to employ again neural network technology or a similar technique based on supervised learning. The network can be trained to recognize specific shapes from a subset of data containing bodies to be detected. A catalogue of examples can be constructed to carry over knowledge from one dataset to the next. As with the spatial filter design, the local direction at every sample position is preferably used when the trained network is applied.

The final output of such geometrical constraints processing is an object enhanced volume.

Edge detection algorithms are routinely used in image processing to establish the boundaries of bodies with similar characteristics. Such algorithms can be applied to both texture enhanced volumes and object enhanced volumes. Edge detection algorithms applied to volumes with enhanced stratigraphic bodies provide an alternative to auto tracking of events in conventional seismic interpretation. (Within extracted volumes, the horizon can be "tracked" simply by defining the horizon to follow a seismic event, such as maximum value, a zero crossing, etc.) The boundaries can also be used as constraints for conventional auto tracking algorithms. By the application of edge detection algorithms to volumes with enhanced faults, the fault planes can also be mapped. The method of the present invention also provides for the tracking of several horizons simultaneously.

The output of edge detection algorithms are co-ordinates of the body boundaries. Any data from any step in the entire process according to the invention within these boundaries can be output for display and characterization purposes. For example, some directional attributes extracted from the volumes may show unique patterns that can be used to tie geological units across faults. By visual—and/or neural network based inspection of individual bodies, the structural and stratigraphic interpretation of a.o. layers, faults and gas chimneys can be finally determined.

After a set of volumes has been processed/interpreted, it may be attractive to repeat the process using knowledge gained from previous runs, or by simply focusing on special objects, regions, etc. Thus it may be desirable to recalculate attributes in selected bodies. This procedure is quite similar to generating horizon consistent attribute maps, a standard function on conventional interpretation workstations.

This form of processing/interpretation in an iterative manner has also great potential for time lapse seismic monitoring of, for example, reservoirs. Due to its very nature, time lapse seismic monitoring is a repetitive process aimed at detecting differences between volumes. In general, the volumes are recorded at regular time intervals and the differences which are to be detected are due to dynamic changes in a reservoir. Examples of these changes are fluid movements, pressure changes, temperature changes, etc. Such differences have a direction, shape and dimension. In other words they are seismic bodies, that can be detected and separated by the method according to the present invention.

An important issue in the context of time lapse seismic monitoring is repeatability. Seismic acquisition parameters, survey parameters, environmental influences and seismic processing may vary between successive recordings. This implies that small reservoir changes may be virtually impossible to detect. To improve repeatability may be very costly, or even impossible using current technology. However, the method of the present invention is expected to be able to cope with this problem more effectively than conventional methods for two reasons.

Firstly, the knowledge of directivity is used to increase detectability of changes between successive recordings and associated difference volumes. Secondly, supervised learning methods such as neural networks are employed, which in general perform better than conventional techniques on noise contaminated data. Moreover, these techniques can be used to remove the unwanted non-repeatable noise by means of a ÔmatchingÔ process. A network can be trained to predict the seismic response of the successive recording whereby the training set is constructed from data points outside the area where changes are to be expected.

The present invention is particularly suited to the treatment of chimney cubes. In a preferred variant, the method increases the detectability and mapping efficiency of the desired objects by an iterative process comprising at least two steps: contrasting (i.e. texture enhancement) followed by object recognition.

Contrasting is performed by extracting several attributes from multiple windows and feeding these to either a supervised, or an unsupervised neural network. The size, shape and direction of the extraction windows as well as the attributes are chosen in relation to the objects we wish to detect. The windows may have a fixed shape and direction, or they have data adaptive forms. In the latter case they follow the local dip and azimuth of the seismic events. The resulting output is a texture enhanced volume, which can be interpreted manually, or used as input to the object recognition phase.

Seismic attributes and supervised and unsupervised neural networks have become increasingly popular in recent years in the realm of quantitative interpretation. The present invention extends the use of these techniques to seismic object detection. Moreover, the concept of directivity is introduced in the attribute extraction process.

Directive seismic source arrays have been used for may years to attenuate unwanted signals hence increasing the contrast between desired and unwanted energy. Since seismic acquisition must record all desired energy the source directivity is generally weak. Also in processing the concept of directivity is used to increase the contrast between objects and their background. Also these directivity processes are weak since they should not attenuate energy from seismic objects of interest.

In this method seismic object is improved by: focusing on one class of objects only; using directivity to extract the attributes; and the use of neural networks to recombine the extracted attributes into new attributes with improved separation power. The target can be relections, faults, chimneys, seismic anomalies or any other object of interest. The seismic texture, the spatial extension and orientation of each of these objects is different. Differences are both due to the seismic response and how the data has been handled in acquisition and processing.

To detect seismic objects requires knowledge about texture, size, shape and direction of the objects. One must ask which is characteristic of a fault, chimney or seismic anomaly in order to extract the best attributes. These attributes are then recombined into even better attributes via neural network mapping so that the objects can be detected in an optimal way. For example, faults are in general dipping more steeply then reflectors and the seismic response changes faster along fault planes than along reflectors. Since fast spatial variations are mostly degraded by inaccuracies in acquisition and processing we know that reflectors usually contain higher temporal frequencies than fault images.

Seismic chimneys on the other hand appear as vertically degraded zones in the seismic image. These zones can completely mask the reflection energy from the sedimentary sequence.

Other examples of seismic objects and their characteristics are: Direct Hydrocarbon Indicators (DHI) and stratigraphic units. A DHI is a seismic anomaly, which is often characterized by a horizontal component, a change in amplitude and phase and a termination against other reflectors. A stratigraphic unit can have many different responses. Usually the response changes along the reflecting unit, due to changes in rock and fluid parameters. Detecting these changes and relating these to geological/petrophysical variations is the subject of seismic reservoir characterization. However, if the general response of a particular unit differs from the surrounding reflectors, this information can be used in an alternative auto-tracking scheme.

Once the decision is made which objects are to be detected an intelligent selection is made of attributes that have potential to increase the contrast. Attributes can be amplitude, energy, similarity, frequency, phase, dip, azimuth etc. Moreover, attributes can be extracted (and merged) from different input cubes e.g. near—and far offset stack, inverted Acoustic Impedance etc. The attributes are made directive by the shape and orientation of the extraction window. In chimney detection for example three vertically oriented extraction volumes can be used to reflect that we are looking for vertically oriented bodies of considerable dimensions. Knowledge about the characteristics of chimneys is used by calculating in each extraction volume such attributes as energy and various types of trace-to-tract similarity.

In fault detection, static, vertically oriented calculation volumes can also be used. To prevent non-vertical faults from "falling out of" the extraction volume(s) the vertical directivity can be reduced. Reducing the vertical extension and increasing the horizontal extension of the extraction volumes does this.

To detect reflectors the calculation volumes may be oriented horizontally. Again since reflectors are not perfectly horizontal the directivity may be reduced.

Generally the extraction volumes are either cubes or cylinders. Other forms may perform better, especially in the case where the objects do not have a fixed direction. For example, to detect faults, energy is an important attribute. In the ideal, it is desirable to calculate the energy in a 2D window along the fault plane. As the orientation of the fault plane is unknown the directivity is reduced e.g. by using a cone shape extraction volume to compute the energy attribute.

The ideal extraction volume follows the desired object at every position. This implies that the extraction volume has a flexible shape, which follows the local dip and azimuth of the data. The local dip azimuth can be calculated in may different ways. The inventors have found that the calculated local dip and azimuth cannot only be used to steer the attribute extraction volumes but it is also a perfect vehicle to remove random noise prior to attribute extraction processes.

After the selected attributes have been extracted at a representative set of data points these will be recombined into a new set of attributes to facilitate the detection process. In this step, supervised or unsupervised neural networks can be used. The main difference between supervised and unsupervised learning approaches lies in the amount of a-priori information that is supplied. Supervised learning requires a representative set of examples to train the neural network. For example networks can be trained to find the (possible non-linear) relation between seismic response and rock property of interest. In this case the training set is constructed from real or simulated well data. In unsupervised (or competitive learning) approaches, the aim is to find structure within the data and thus extract relevant properties, or features. The resulting data segments (patterns) still need to be interpreted. An example of this approach is the popular waveform segmentation method whereby waveforms along an interpreted horizon are segmented. The resulting patterns are then interpreted in terms of facies-or fluid changes.

In the object detection method the same principles are used. With unsupervised learning approaches, attributes related to the objects to be detected are used. With supervised learning approach, not only are meaningful attributes used but locations in the seismic cube are also identified where examples of the class of objects to be detected are present. Seismic attributes are calculated at these positions as well as at control points outside the objects. The neural network is then trained to classify the input location as falling inside or outside the object. Application of the trained network yields the desired texture enhanced volume in which the desired objects can be detected more easily.

Edge detection algorithms and pattern recognition tools can then be applied to the texture enhanced volume to further improve the detectability of the object. The concept of directivity can also be applied in these processes.

The chimney cube is a new seismic entity. A chimney cube is a 3D volume of seismic data, which highlights vertical disturbances of seismic signals. These disturbances are often associated with gas chimneys. The cube facilitates the difficult task of manual interpretation of gas chimneys. It reveals information of the hydrocarbon history and fluid flow models. In other words the chimney cube may reveal where hydrocarbons originated, how they migrated into a prospect and how they spilled from this prospect. As such a chimney cube can be seen as a new indirect hydrocarbon indicator tool.

Chimney interpretation is also used in geo hazard evaluation. Correlating chimneys with mapped shallow gas indicators may confirm the presence of shallow gas. As chimneys are signs of partially degraded data, the cube can also be used as a quality control tool in processing and in the evaluation of attribute and depth maps.

Finally the cube can be used in determining acquisition parameters. For example the success of 4C seismic depends on the ability to undershoot gas, hence it depends on the interpretation of chimneys.

The chimney cube whose interpretation will be described below was created as follows:

1. A seed interpretation was made with locations inside manually interpreted chimneys and in a control set outside the chimneys.
2. At the seed locations various energy and similarity attributes were extracted in three vertically aligned extraction volumes around the locations (directivity principle).
3. Step 1 and 2 were repeated to create and independent test set.
4. A fully connected Multi-Layer-Perceptron type of neural network was trained to classify the attributes into two classes representing chimney or non-chimney (output vectors 1,0 or 1,0).
5. The trained network was applied to the entire data set yielding outputs at each sample location. As the outputs are complementary we passed only the output on the chimney node to produce the final result:acube with values between approx. 0(no-chimney) and I (chimney).

Thus, a semi-automated method of detection of seismic objects is provided. The method, which has wide applicability, is seismic processing and interpretation preferably includes:

1. Focussing on one class of objects at the time.
2. Extraction of attributes with potential to increase the contrast between desired object and the background.
3. The use of directivity in the attribute extraction process.
4. The use of supervised and unsupervised neural networks to recombine the attributes into new attributes with improved separation power.
5. The possibility to iterate the process by first enhancing the texture of the objects then detecting them by either manual interpretation, or automated detection after application of edge detection and pattern recognition algorithms.

A specific application of the method is chimney cube. This cube may add a new dimension to seismic interpretation as an indirect hydrocarbon detector.

The mapping of seismic chimneys can be important in exploration as hydrocarbon indicators. The chimneys indicate present or previous vertical migration of fluids containing hydrocarbons, and can indicate movement of hydrocarbons between different geological sequences. There are seismic indications that vertical migration of hydrocarbons appear periodically. The mapping of chimneys at different levels may help to understand the hydrocarbon migration history, the migration route between a source rock and shallower prospects, as well as migration of hydrocarbons between prospects, as well as migration of hydrocarbons between prospects and shallower sediments.

As the upward migrating hydrocarbons may charge any shallower reservoir, the mapping of chimneys also has significance in shallow gas hazards evaluations for drilling.

Escape of fluids or gas through the seabed may generate non-favorable conditions for seabed installations, like pockmarks, and seabed instability. The mapping of shallow chimneys is therefore important in field development projects.

In the past, $CO_2$ resulting from petroleum production, has been reinjected to the underground to prevent the release of $CO_2$ to the air. The mapping of possible chimneys is in such a case important to find a suitable injection location with low risk of $CO_2$ migration to the seabed, as well as in time-lapse seismic analysis for monitoring of possible $CO_2$ migration to the seabed during and after injection.

To better identify chimneys, seismic attributes which increase the contrast between chimneys and the surroundings are used. The amplitude values within chimneys are, in the majority of cases, observed to be low, as compared to the surroundings. Likewise, the seismic trace similarity is observed to be low within chimneys. Attributes that can be used to increase contrast between chimneys and the surroundings are amplitude, energy, trace correlations, tract similarity etc. The different attributes are input to a neural network which is trained to do a classification into chimneys and non chimneys. The vertical extension of chimneys is used as a criterion in the classification. As chimneys appear as vertical disturbances in seismic data, all vertical disturbances with the same seismic characteristics will be enhanced.

The final product is a cube where chimneys have been quantified by assigning maximum values (high probability) to the samples within the chimneys and minimum values (low probability) to the samples within the surrounding volume.

Similar principles can be used to identify and quantify fault planes and reflectors. The final cubes can be loaded into any standard interpretation or mapping system for visualization like a standard seismic cube. The method may be applied on 2D as well as 3D data.

BRIEF DESCRIPTION OF THE DRAWINGS

The invention may be carried into practice in various ways and some embodiments will now be described by way of example with reference to the accompanying drawings, in which.

DETAILED DESCRIPTION OF THE DRAWINGS

Figure 1:
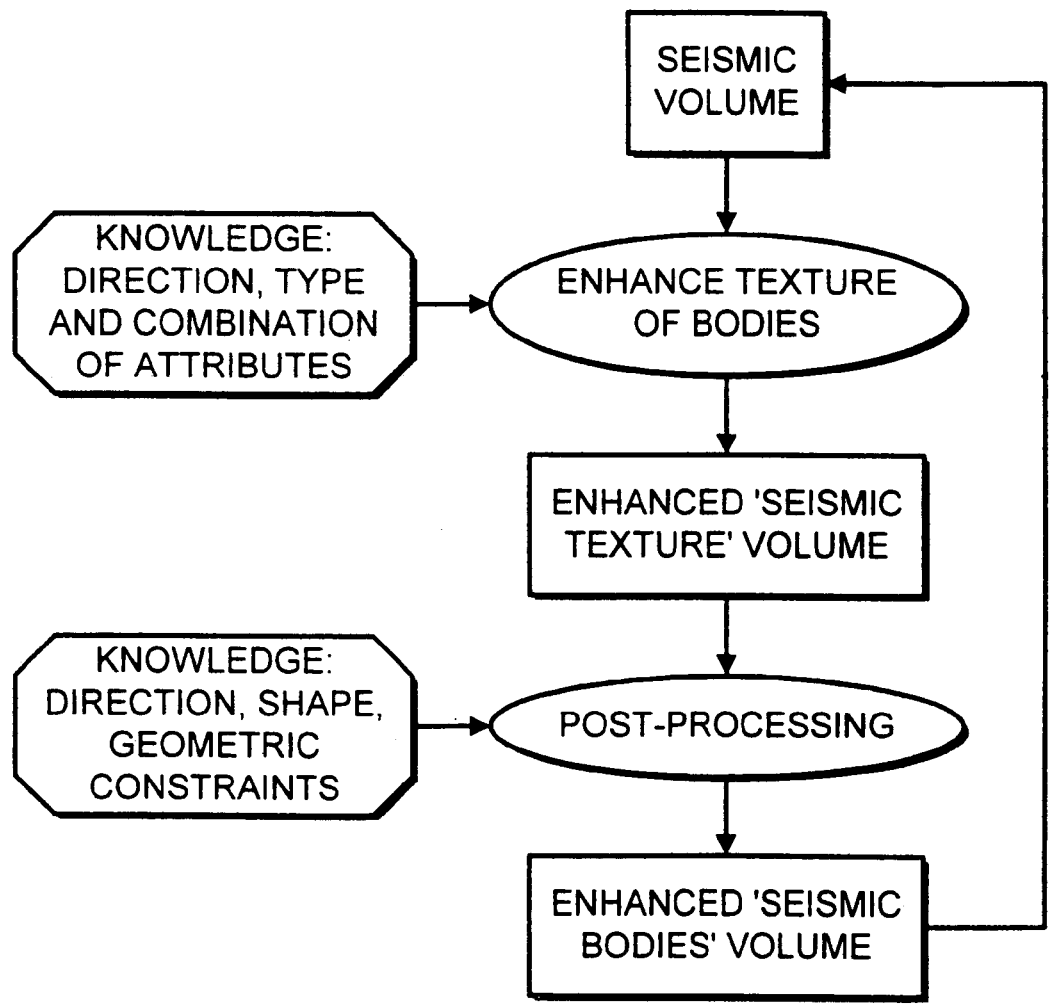
FIG. 1 is an outline procedure of a method in accordance with the invention.

FIG. 1 shows schematically a preferred system in accordance with the invention. The procedure has effectively two steps. In the first step, a seismic volume is defined and in dependence upon the nature of what is known to be likely to be present, the appropriate attributes are selected. These are processed using control volumes within the seismic volume which are tailored in their shape and directionality to suit the geological feature or body which is to be studied. This results in an enhanced texture of the body; a texture enhanced volume.

In the second step, shape and geometrical constraints are applied, again using the known directionality. This results in an enhanced separation; an object enhanced volume.

The process is then repeated on successive seismic volumes. The entire process can also be repeated after the elapse of a significant time interval. In this way, the development of a body, such as a reservoir can be monitored.

The effectiveness of directional attributes can be demonstrated with two examples. The first is horizon based, the second is three-dimensional.

EXAMPLE I

Figure 2A:
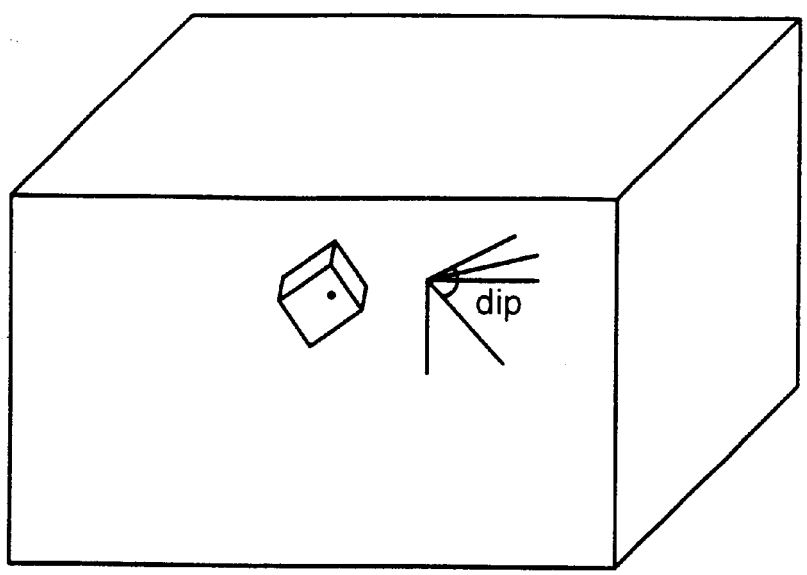
FIG. 2a is a schematic representation of extraction cubes within a seismic control volume for the study of an inclined object.
Figure 2B:
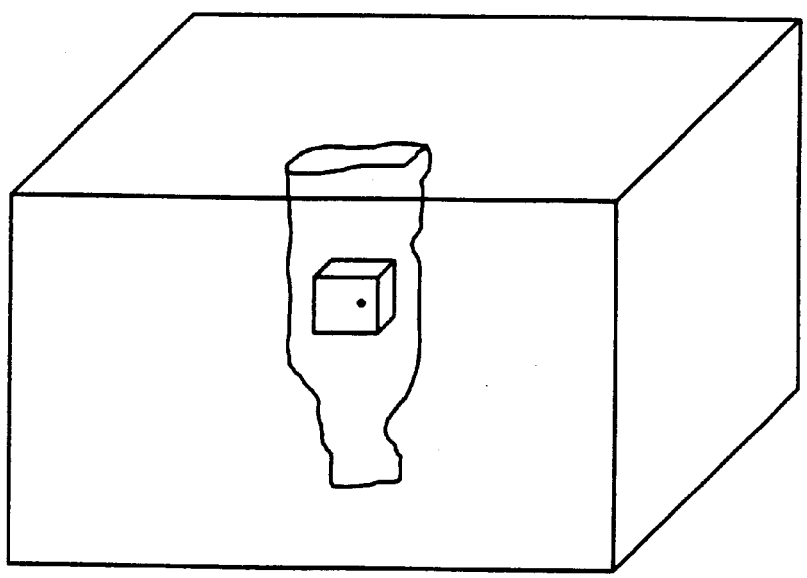
FIG. 2b is a view similar to FIG. 2a for a gas chimney.

Attributes extracted around a horizon are in principle directional attributes. In conventional processing the orientation of the 3-D cube used is not changed, however, in the present invention, directionality is used to locate the extraction control volume. For optimal use of directivity the orientation of the control volume must be adapted to the local conditions. FIG. 2a shows this principle. In practice, the top and bottom of the extraction cube shown as the control volume would follow the horizon; the extraction cube is not in fact a cube, nor a rectangle but a flexible body with tops and bottoms parallel to the horizon. This same concept is valid for the generalized 3-D case where the extraction bodies follow the surface that is defined from a central extraction point.

The difference between 'conventional' and 'true' directivity for an attribute that expresses the similarity between trace segments surrounding an extraction point can be shown by computing the similarity in a time gate of −40 to +40 ms. In the conventional case, the orientation of the extraction cube is constant, in the true directivity case, the orientation follows the horizon and results in an enhanced definition of the object.

EXAMPLE II

When gas seeps through the subsurface, it may leave a high gas saturation trail which may show up on seismic data as a chimney. Detection of chimneys is important from a drilling safety perspective. Also, from an exploration point of view, there may be a need to detect gas chimneys.

On seismic data, gas chimneys show up as vertical disturbances. Within the chimney, the energy decreases as does the trace-to-trace similarity (coherency). The shape of the chimney may vary considerably. Some are cylindrical (above a mound). Others are elongated or curved (along fractures and faults).

In this example a neural network is used to learn to recognize chimneys from a representative set of data points which are either inside, or outside a chimney. Input to the network is the inline number plus a set of directional attributes extracted in three 80 ms time gates. The direction is vertical, so the three time gates are located above (−120,−40), around (−40,+40) and below (+40,+120) each extraction point. In each gate, the energy of the central trace is computed together with 4 multi-trace attributes which express the similarity between traces surrounding the central trace. The desired output is 1 for a chimney and 0 for a non-chimney. The trained network is applied to the entire seismic volume yielding a new control volume in which the texture of chimneys has been enhanced, in this case, expressed on a scale from 0 (no chimney) to 1 (chimney). Chimneys appear in different shapes. Shape information can now therefore be utilized, e.g. via spatial filters and/or shape detection techniques to further improve the chimney detection.

What is claimed is:

1. A method of processing acquired seismic data which comprises extracting seismic information from the acquired data in a direction along the spatial direction of a body of interest thereby producing directional seismic attributes, characterized in that the directional attributes are combined using a supervised learning approach.

2. The method as claimed in claim 1, characterized in that the supervised learning approach comprises training an algorithm with a representative set of examples, by the steps of: identifying a set of points in a control volume of seismic data representative of a body and background; extracting selected directional attributes at these points and conveying these to the algorithm; and allowing the algorithm to learn how to combine the attributes, to provide an optimal classification into body and background.

3. The method as claimed in claim 2, characterized by applying the trained algorithm to a seismic volume, extracting directional attributes from every sample position in the seismic volume; and using the trained algorithm to classify the seismic volume in terms of body and background.

4. The method as claimed in claim 2, said algorithm comprises an artificial neural network.

* * * * *